July 1, 1952  S. T. BREKKE  2,601,754
ADJUSTABLE SICKLE HOLD-DOWN
Filed April 3, 1950

Stanley T. Brekke
INVENTOR.

BY Clarence A. O'Brien
and Harvey B. Jacobson
Attorneys

Patented July 1, 1952

2,601,754

UNITED STATES PATENT OFFICE 2,601,754

ADJUSTABLE SICKLE HOLD-DOWN

Stanley T. Brekke, McIntosh, Minn.

Application April 3, 1950, Serial No. 153,566

4 Claims. (Cl. 56—296)

This invention comprises novel and useful improvements in an adjustable sickle hold-down and more specifically pertains to an attachment for exerting pressure upon the sickle knives of a mowing machine to prevent and adjustably minimize clearances between the sickle bar and finger bar which would detrimentally affect the operation of the mower.

The principal object of this invention is to provide an improved attachment which will facilitate and render more accurate the application of controlled pressure to the sickle bar of a mowing machine for holding the same against the finger bar during operation of the mower.

A further important object of the invention is to provide an attachment in conformity with the preceding object wherein a pressure plate may be adjustably urged and locked in a controlled pressure contact with the sickle bar of a mower; and wherein the pressure plate shall be resiliently urged away from the sickle bar.

A still further important object of the invention is to provide a sickle bar adjusting device which shall be universally applicable to various conventional types of mowing machines.

These, together with various ancillary features and objects of the invention, which will later become apparent as the following description proceeds, are attained by the present invention, a preferred embodiment of which has been illustrated, by way of example only, in the accompanying drawings, wherein.

Figure 1:
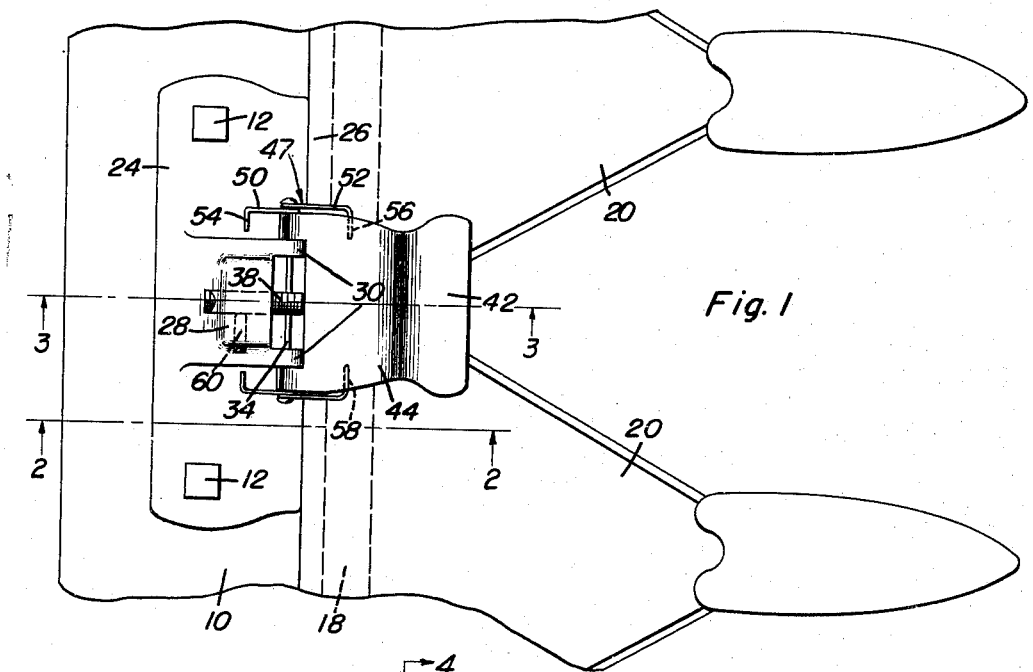
Figure 1 is a fragmentary top plan view of a portion of a sickle bar type of mower showing one of the adjustable hold-down devices applied thereto.
Figure 2:
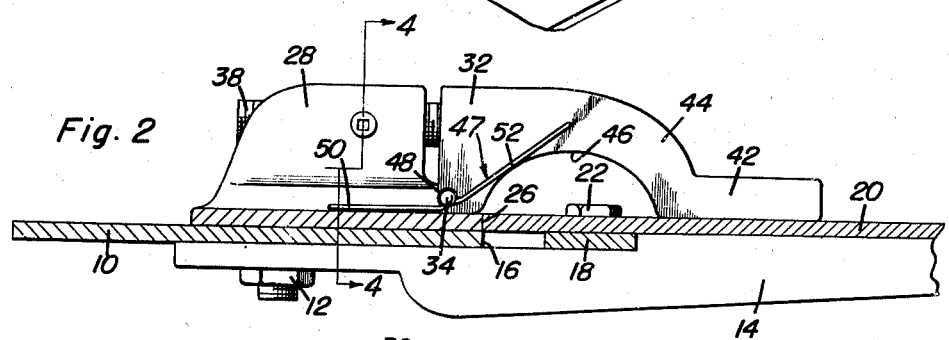
Figure 2 is a fragmentary vertical transverse sectional enlarged view taken substantially upon the plane indicated by the section line 2—2 in Figure 1.
Figure 3:
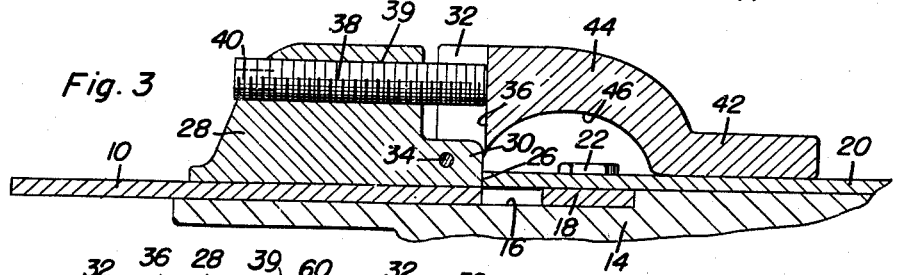
Figure 4:
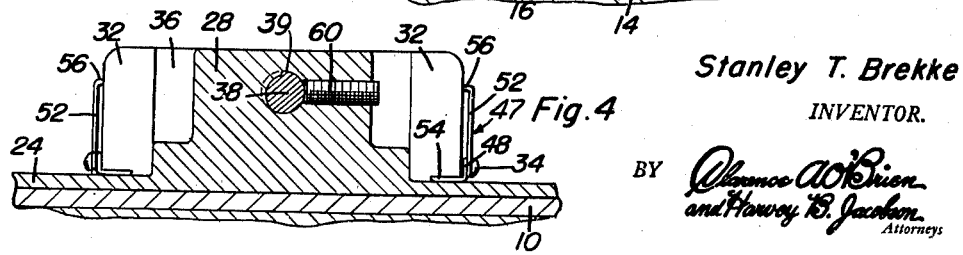

Figure 3 is a further enlarged vertical transverse sectional view taken through the device itself substantially upon the plane indicated by the section line 3—3 of Figure 1 and showing certain structural features of the same; and Figure 4 is a vertical longitudinal sectional further enlarged view taken at right angles to the showings of Figures 2 and 3 and substantially upon the plane of the section line 4—4 of Figure 2 and showing a further detail of the device.

Conventional types of sickle bar mowers are provided with hold-down brackets for maintaining the sickle bar in sliding contact with a stationary finger bar, each of these bars being provided with the customary knife elements. Such conventional devices, are however, subject to the objection and disadvantages characteristic of being incapable of adjustment in order to compensate for wear developing between the relatively movable bars, or between the movable sickle bar and the adjacent pressure surface of the hold-down device. It has therefore been necessary to entirely replace the hold-down device now in conventional use as wear arises, and obviously if wear occurs between the two bars, it is a difficult job to properly adjust the new device to apply the requisite pressure to the bar assembly.

It is therefore a fundamental purpose and intent of the present invention to provide a sickle bar hold-down device which will overcome these prior defects by permitting an accurate and easy adjustment of the hold-down pressure applied to the finger and sickle bars; which shall be capable of attachment to any conventional form of machine employing sickle bar mowers, including all types of mowers, binders, swathers, and combines.

Referring now more specifically to the accompanying drawings, wherein like numerals designate similar parts throughout the various views, it will be seen that there has been disclosed a portion of a conventional form of sickle bar assembly, the same including a stationary finger bar 10, which has attached thereto, as by bolts 12, the customary fingers 14. A channel 16 extends longitudinally of the finger bar 10 and slidably receives a sickle bar 18 therein for longitudinal reciprocatory movement, this sickle bar being provided with a plurality of sickle knives 20, each secured as by a fastening bolt 22, in accordance with conventional practice. The knives 20 register with and operate with the fingers 14 of the finger bar, to effect the sickle knife cutting operation. The construction and operation of the sickle bar assembly so far described is conventional and well known and further explanation or description of the same is therefore believed to be unnecessary for the purposes of this invention.

In accordance with this invention, an adjustable hold-down device is provided, the same consisting of and including a mounting bracket 24 which may conveniently comprise a flat plate directly mounted upon the upper surface of the finger bar 10 and secured thereto as by a pair of the finger fastening bolts 12, this mounting plate having a forward vertical edge 26 which is adapted to abut and constitute a guide for the adjacent edges of the sickle bar knives 20 as will be apparent from Figures 2 and 3.

Intermediate its ends, the mounting bracket 24 is provided with an upstanding boss or the like 28, the same having a pair of parallel, forwardly extending lugs 30.

A pressure plate is pivotally mounted upon the mounting bracket as by means of a pair of parallel lugs 32, which are pivoted to the lugs 30 as by a horizontal pivot pin 34. Between the lugs 32 the pressure plate is provided with a vertically disposed abutment surface 36 which is adapted to be engaged by an adjusting screw 38 which is disposed in a horizontal plane and extends through a screw-threaded bore 39 in the boss 28. This screw may be provided with a non-circular recess 40 at one end to permit adjustment of the screw, as by an Allen wrench or the like. The thrust plate further includes at its outer extremity a pressure pad or plate 42 which is adapted to rest upon and press downwardly upon the upper surface of the knife elements 20 of the sickle bar assembly. The pressure pad or plate 42 is connected to the lugs 32, as by an upwardly bowed or arcuated portion 44, which is provided with an arcuate clearance 46 overlying and providing a clearance for the fasting studs 22 which reciprocate with the sickle bar 18, as shown in Figures 2 and 3.

A resilient means is provided for urging or biasing the pressure plate about its pivot pin 34 and in a direction to urge the abutment surface 36 against the end of the adjusting screw 38. This resilient means may conveniently comprise a pair of springs 47, each including a central helical portion 48 which portions embrace and are mounted upon and supported by the end portions of the pivot pin 34, each of the springs having a pair of opposite ends 50 and 52 with angulated portions 54 and 56 respectively engaging the upper surface of the mounting bracket 24 and being seated in transverse recesses or sockets 58 in the sides of the member 44.

A set screw 60 extends through the side of the boss 28 and is adapted to engage the side of the adjusting screw 38 for locking the same in adjusted position.

From the foregoing, it will be apparent that the mounting bracket 24 may be secured to any conventional form of finger bar 10, with its forward edge 26 adapted to abut and constitute a guide for one edge of the sliding knives 20 carried by the reciprocating sickle bar 18. The spring means urges the pressure plate upwardly about its pivot pin 34, in a direction to release the pressure upon the sickle knives 20. It will be evident that by loosening the set screw 60 and adjusting the adjusting screw 38 that the latter will abut the abutment surface 36 and cause a pivoting movement of the pressure plate downwardly about the pivot pin 34 until any desired pressure may be applied by the pressure pad 42 to the upper surface of reciprocating knives of the sickle bar.

The cut-away portion 46 permits ample clearance for different types of sickle bar assemblies.

From the foregoing, the construction and operation of the device, together with its many advantages, will be readily understood, and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claims.

Having disclosed and described the invention, what is claimed as new is:

1. In a mowing machine having a finger bar and a sickle bar reciprocable relative thereto; a sickle bar adjusting device comprising a mounting bracket having a pair of forwardly extending lugs, means for securing said mounting bracket to a finger bar, a pressure plate for engaging the sickle bar to hold the same in sliding contact with the finger bar having a pair of rearwardly extending lugs embracing said forwardly extending lugs, means engaging both pairs of lugs for pivotally connecting said pressure plate to said mounting bracket, resilient means engaging and biasing said bracket and plate, means operatively interposed between and engaging said bracket and pressure plate for pivotally adjusting said plate relative to said bracket.

2. The combination of claim 1 wherein said mounting bracket has a vertical guide surface engaging one edge of said sickle bar.

3. The combination of claim 1 wherein said resilient means includes a helical spring having an intermediate helical portion embracing said pivot pin and leg portions engaging said bracket and plate.

4. The combination of claim 1 wherein said last mentioned means comprises a vertical abutment surface on said plate between said lugs, an adjusting screw disposed between said forwardly extending lugs and having its axis lying in a horizontal plane above said pivotal connecting means and carried by said bracket and engaging said abutment surface.

STANLEY T. BREKKE.

REFERENCES CITED

The following references are of record in the file of this patent:

UNITED STATES PATENTS

| Number | Name | Date |
|---|---|---|
| 718,351 | Hopkins | Jan. 13, 1903 |
| 762,717 | Hobson | June 14, 1904 |
| 792,021 | Griffiths | June 13, 1905 |
| 1,583,167 | Pehrson | May 4, 1926 |
| 1,576,264 | Beckwith | Mar. 9, 1946 |

FOREIGN PATENTS

| Number | Country | Date |
|---|---|---|
| 226,894 | Germany | Oct. 10, 1910 |
| 556,497 | France | Apr. 16, 1923 |